United States Patent Office.

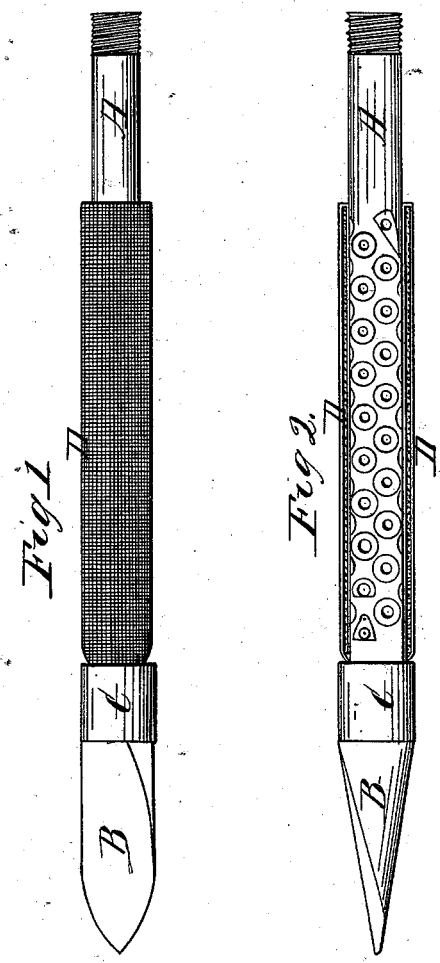

DAVID BAKER, OF BOSTON, MASSACHUSETTS.

Letters Patent No. 81,580, dated September 1, 1868.

---

IMPROVEMENT IN WELL-TUBES.

---

*The Schedule referred to in these Letters Patent and making part of the same.*

---

TO ALL WHOM IT MAY CONCERN:

Be it known that I, DAVID BAKER, of Boston, in the county of Suffolk, and in the State of Massachusetts, have invented a new and useful Improvement in Well-Tubes; and do hereby declare that the following is a full, clear, and exact description thereof, reference being had to the accompanying drawings, and to the letters of reference marked thereon.

The nature of my invention consists in the construction of countersinks or recesses around the holes of a well-tube, and providing them with a double strainer and filter, to prevent sand or other matter to enter the tube.

To enable others skilled in the art to make and use my invention, I will proceed to describe its construction and operation.

In the annexed drawings, forming part of this specification, A represents a well-tube provided with a point, B, made of iron, steel, or any other suitable material, which point is twisted, and thus forms a screw, so that when the tube is driven into the ground, it will revolve, or if the tube is turned, it will go downward. When the tube is to be sunk by driving, the twist in the point B should be left-handed, as the revolving motion of the tube, which will be to the left, will then tighten the screws by which the tubes are connected; but when the tube is to be sunk by turning, the twist should be made the other way.

The diameter of the upper end of the point B should be a trifle larger than that of the coupling c, which connects it with the tube A by a screw or other suitable means, to be securely fastened, and the coupling c should be large enough to extend beyond and form a guard for the strainer D, which is put on the tube and over the holes, and which may rest on the coupling c or not, as may be desired, and thus it will protect the strainer D from being torn by the rough earth on its passage down.

The holes in the tube are provided with countersinks or recesses, which may be made concave by bending, sloughing, or grooving the tube in such a manner as to produce circular, elliptical, or spiral indentations crosswise or lengthwise on the tube, or in any other shape that may be desired, for the purpose of allowing more water to pass through the strainer D into the tube A than would be the case if the holes were cut without these countersinks or recesses.

The strainer D is constructed of two screens, made of wire or any other suitable material, one inside of the other, and fastened together at top and bottom. The space or chamber thus formed between the two screens is filled with sifted sand or other suitable material for filtering the water before passing into the tube, and preventing quicksand and other fine matter from entering into the same. The strainer, when put on the tube over the holes, is fastened both at the top and bottom. At the bottom it may be fastened either to the tube or coupling, whichever may be desired.

Having thus fully described my invention, what I claim as new, and desire to secure by Letters Patent, is—

1. The double strainer D, with intervening filtering-material, arranged and operating in combination with or in continuation of a well-tube, substantially as and for the purposes set forth.

2. The point B, coupling C, tube A, and strainer D, all constructed, arranged, and operating substantially as and for the purposes above set forth.

In testimony that I claim the foregoing, I have hereunto set my hand, this 25th day of April, 1868.

DAVID BAKER.

Witnesses:
LEOPOLD EVERT,
A. N. MARR.